United States Patent [19]

Andreychek

[11] 4,251,246
[45] Feb. 17, 1981

[54] SAFETY DEVICE FOR SIDE LOADING FILTERING APPARATUS

[75] Inventor: Paul D. Andreychek, Pittsburgh, Pa.

[73] Assignee: Mine Safety Appliances Company, Pittsburgh, Pa.

[21] Appl. No.: 114,842

[22] Filed: Jan. 24, 1980

[51] Int. Cl.³ .............................................. B01D 46/00
[52] U.S. Cl. ....................................... 55/481; 55/502; 55/504
[58] Field of Search ................ 55/478, 480, 481, 502, 55/504

[56] References Cited

U.S. PATENT DOCUMENTS

| | | | |
|---|---|---|---|
| 3,423,908 | 1/1969 | Hart | 55/484 X |
| 3,593,503 | 7/1971 | Andrews | 55/481 |
| 3,816,984 | 6/1974 | Neumann | 55/481 X |
| 4,023,944 | 5/1977 | Beane | 55/481 |
| 4,124,361 | 11/1978 | Revell | 55/484 X |

Primary Examiner—Kathleen J. Prunner
Attorney, Agent, or Firm—Brown, Flick & Peckham

[57] ABSTRACT

A filter housing has an access opening for passage of a filter sideways into and out of the housing, the opening being surrounded by an outwardly extending flange surrounded by a flange on a removable door. Inside the housing, at the side opposite its outlet opening, is a pressure bar and a manually rotatable shaft that extends out of the housing beside the door so that it can be turned to actuate means for forcing the bar against a filter aligned with the outlet opening to seal the filter against the housing wall around the opening. Outside of the housing the shaft is provided with a screw thread, on which there is a nut for moving a doorstop into a position where it will prevent closing of the door whenever a filter is not being pressed against the housing side wall by the pressure bar.

4 Claims, 5 Drawing Figures

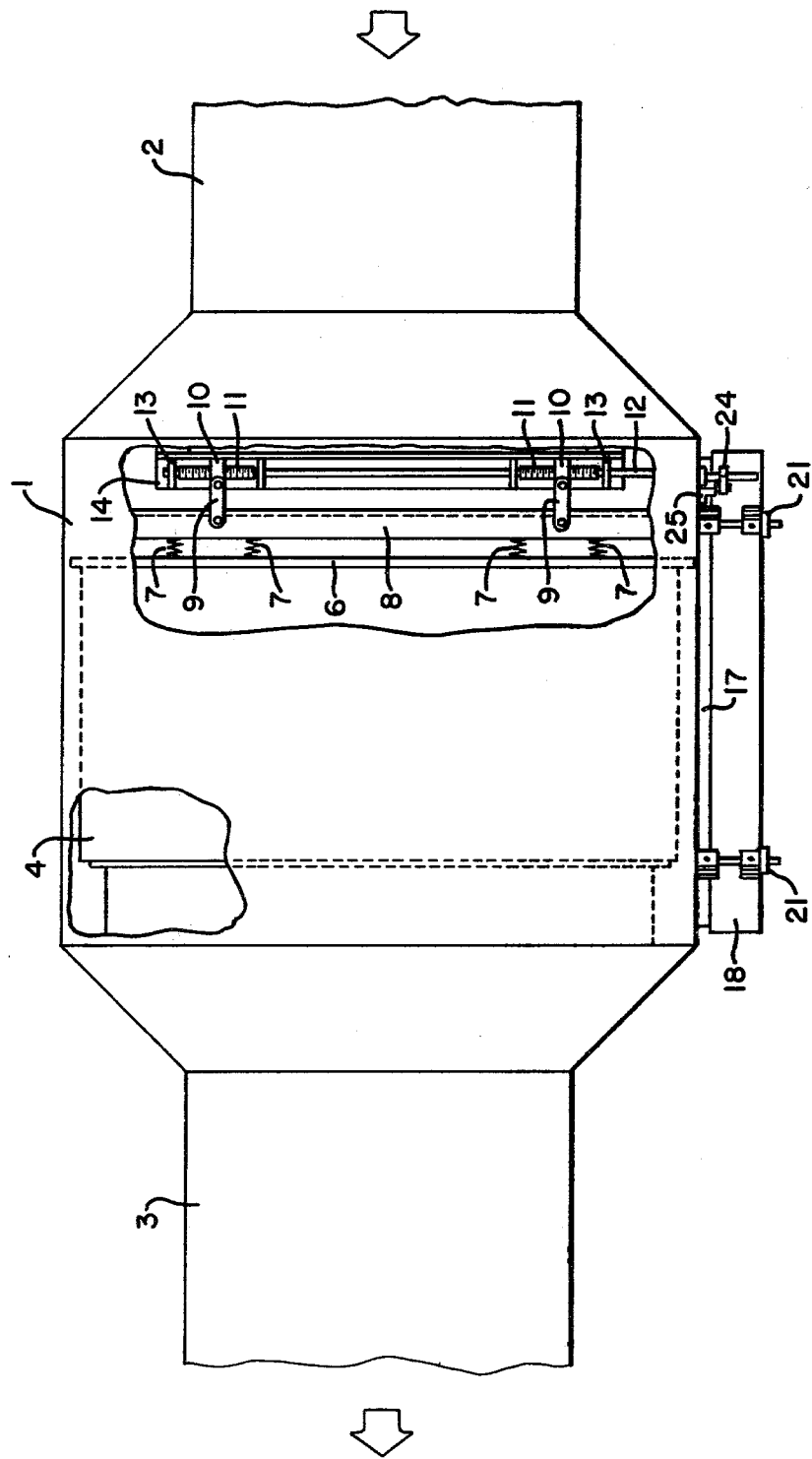

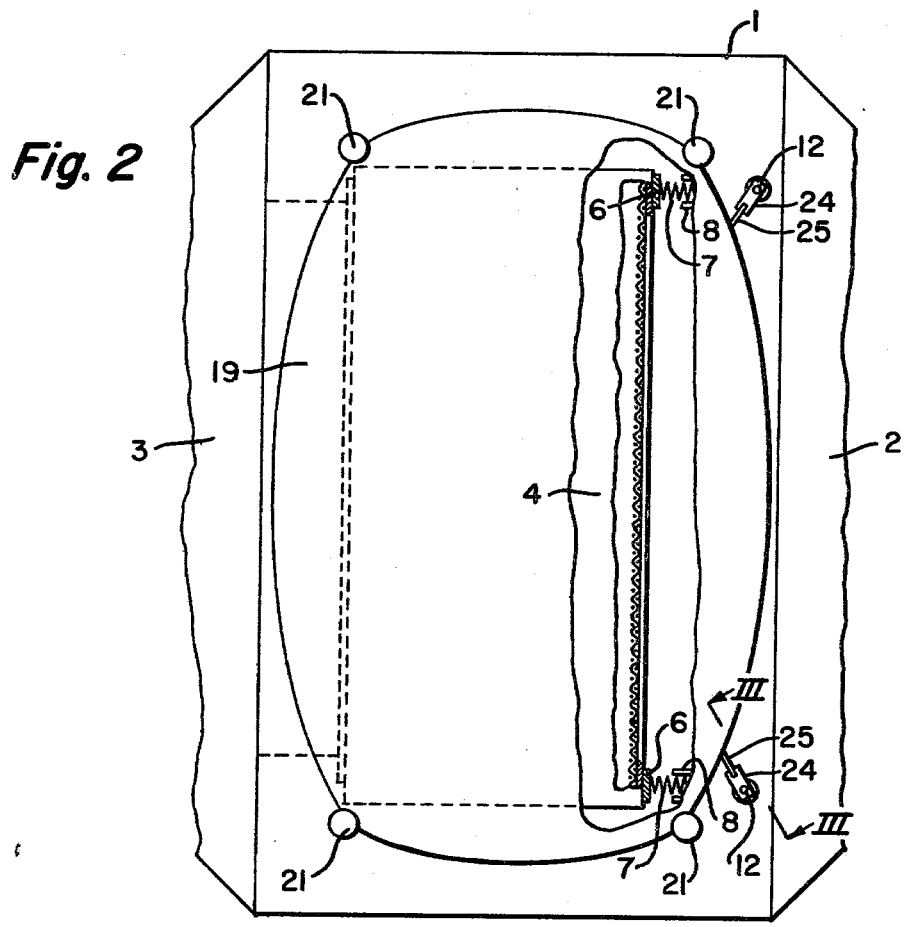
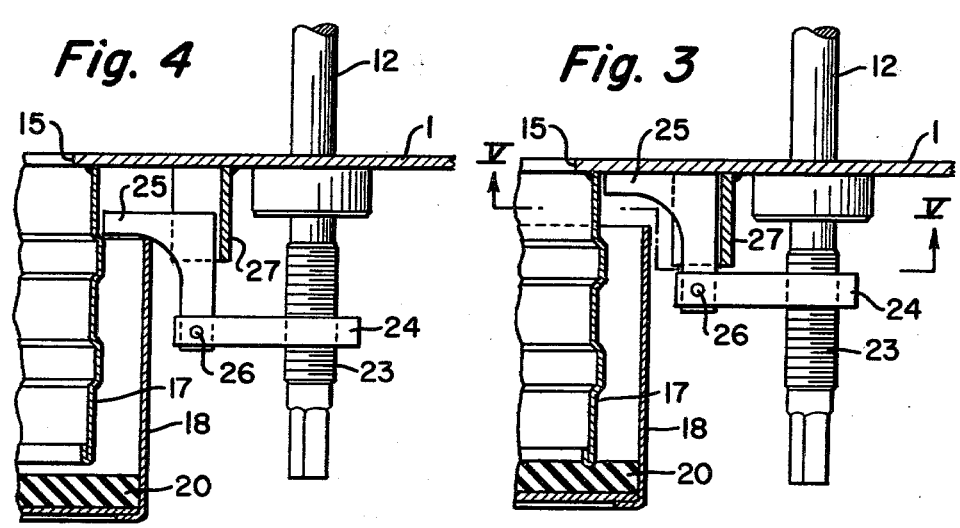
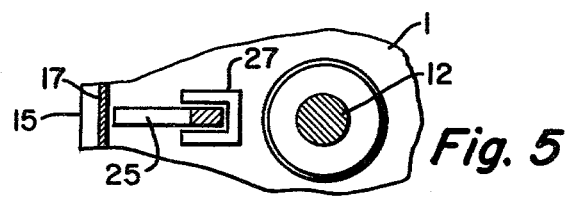

SAFETY DEVICE FOR SIDE LOADING FILTERING APPARATUS

BACKGROUND OF THE INVENTION

In one type of filtering apparatus a filter is moved sideways through an access opening into a housing and into alignment with an outlet opening. Then the filter is pressed against the housing around the opening by means of pressure bars that are moved toward and away from the filter by mechanisms that include rotatable shafts extending out through the end of the housing beside the access opening. After a filter has been placed in the housing, a door for the access opening is clamped in place to seal the opening. Before or after this happens, the filter is supposed to be clamped in place by means of the pressure bars. However, it sometimes happens that the operator closes the door without making sure that the filter has been forced into sealing position around the outlet opening in the housing, resulting in leakage around the filter.

It is among the objects of this invention to provide a safety device for the type of filtering apparatus just described, whereby the door of the filter housing cannot be moved into final tightly closed position until the filter has been properly sealed in place.

The preferred embodiment of the invention is illustrated in the accompanying drawings, in which FIG. 1 is a plan view of the closed filtering apparatus, with parts broken away to show the filter unit clamped in place;

FIG. 2 is an end view, with part of the door and filter broken away;

FIG. 3 is an enlarged fragmentary vertical section taken on the line III—III of FIG. 2;

FIG. 4 is a view similar to FIG. 3, but showing the door prevented by the safety device from being closed; and FIG. 5 is a vertical section taken on the line V—V of FIG. 3.

DESCRIPTION OF THE INVENTION

Referring to FIGS. 1 and 2 of the drawings, a filter housing 1 has at one side an inlet opening connected by a duct 2 to a source of gas, such as air, to be filtered. The air will flow through the housing and out through an opening in its opposite side wall, this outlet opening being connected to a duct 3 by which filtered air is conducted away. As the air passes through the housing it flows through a rectangular filter unit 4 engaging the side wall of the housing around the outlet opening.

The filter unit is pressed tightly against the housing side wall by means of a pair of vertically spaced, horizontal pressure bars 6 parallel to the side wall. These bars engage the front of the filter near its top and bottom as shown in FIG. 2. Only the lower bar is shown in FIG. 1. Each bar is supported by coil springs 7 projecting laterally from a horizontal channel member 8, to which a pair of links 9 (FIG. 1) spaced lengthwise of the channel are pivotally connected on vertical axes. The other ends of the links are pivotally connected to travelling nuts 10 mounted on a pair of screw threads 11 with which a horizontal shaft 12 is provided. One of the threads is a right-hand thread and the other is a left-hand thread so that when the shaft is turned, the two nuts are moved either toward each other or away from each other. The shaft is rotatably mounted in bearings 13 secured in an angle bar 14 that is fastened to the adjacent side of the filter housing.

The two shafts extend out through one end of the housing beside an access opening 15, through which a filter unit can be moved sideways into and out of the housing. The outer end of each shaft is formed for receiving a removable crank (not shown) by which the shaft can be turned. When turned in the direction that will move the two nuts 10 toward each other, links 9 connected to those nuts will be brought into more parallel relation as shown in FIG. 1 to cause the adjoining channel member 8 and springs to press the pressure bar 6 against the filter, thereby forcing the filter into sealing engagement with the side wall of the housing around its outlet opening.

The access opening 15 in the end of the housing is surrounded by a flange 17 that extends outwardly away from the housing. This flange is surrounded in turn by the flange 18 (FIG. 3) on a removable cover or door 19 for the opening. The inside of the door is provided with a gasket 20 that is pressed against the outer edge of the housing flange when the door is clamped in place by toggle bolts 21 pivotally connected to the end wall of the housing. In its tightly closed position, the door flange 18 remains spaced from the housing end wall.

It is a feature of this invention that a safety device is provided which will prevent the door from being completely closed unless the filter has first been clamped into place by the two pressure bars 6. Accordingly, as best shown in FIG. 3, the outer end of each rotatable shaft 12 extends several inches away from the housing and is provided with a screw thread 23, on which there is a travelling nut 24. The nut has a lateral extension that projects toward the housing flange 17. The free inner end of the nut extension is bifurcated and receives one end of a door stop 25, which is held in the extension by means of a pin 26. The stop preferably is L-shape, with one leg of the L extending parallel to the housing end wall toward housing flange 17 and into the space between the edge of the door flange 18 and the housing. The other or outer leg of the stop extends away from the first leg to the nut extension. To prevent the nut from turning on the shaft, the outer leg of the stop is slidably mounted in a channel-shape guide member 27, one end of which is welded to the housing end wall.

OPERATION

When a shaft 12 is rotated to move a pressure bar 6 inside the housing into retracted position, the turning of the shaft causes nut 24 to move outwardly along screw thread 23, thereby moving the door stop 25 outwardly away from the housing into a position in which it will prevent the door from being completely closed, as shown in FIG. 4. In order to move the door stops into positions where they cannot be engaged by the door flange, so that the door can be closed tightly, it is necessary to turn the shafts 12 in the direction opposite to their bar-retracting direction far enough to cause the pressure bars to force the filter into sealing engagement with the side of the housing around its outlet opening. This rotation of the two shafts will also move both door stops toward the filter housing. With the stops out of the way, the door then can be clamped shut with the assurance that the filter is in proper position.

According to the provisions of the patent statutes, I have explained the principle of my invention and have illustrated and described what I now consider to represent its best embodiment. However, I desire to have it understood that, within the scope of the appended claims, the invention may be practiced otherwise than as specifically illustrated and described.

I claim:

1. In side loading filtering apparatus, the combination with a housing having an inlet and having a side wall provided with an outlet opening, the housing having a wall at one end of said side wall provided with an access opening for passage of a filter sideways into and out of the housing, a flange surrounding the access opening and extending outwardly from said end wall, a removable door for the access opening provided with a flange surrounding said first-mentioned flange, means for moving the door toward the housing to close the access opening, a pressure bar inside the housing at the side opposite said side wall and parallel thereto, a manually rotatable shaft in the housing parallel to said bar and provided with a pair of screw threads spaced lengthwise thereof, said shaft extending out through said end wall beside the door and having an outer end for turning the shaft, and means actuated by said threads when the shaft is turned for forcing the bar against a filter aligned with said outlet opening to seal the filter against said side wall around the opening, of a safety device comprising a third screw thread on said shaft outside of said housing, a nut on said third screw thread for movement toward and away from the housing when the shaft is rotated, and a door stop movable with said nut and projecting between said door flange and housing end wall, the stop being engageable by the door flange whenever a filter is not being pressed tightly against said side wall by the pressure bar to thereby prevent the door from being completely closed, and the stop being moved by said nut away from the door flange toward said end wall when a filter is sealed against said side wall, whereupon the door can be closed tightly.

2. In side loading filtering apparatus according to claim 1, said nut being provided with a lateral projection extending toward said door and connected at its free end with said stop.

3. In side loading filtering apparatus according to claim 1, a guide member projecting from the outside of said end wall, said stop slidably engaging said guide member for movement relative thereto only toward and away from the housing.

4. In side loading filtering apparatus according to claim 1, said nut being provided with a lateral projection extending toward said door, one end of a channel-shape guide member being secured to said end wall, and said stop being L-shaped with one leg of the L slidably mounted in said channel and the other leg of the L projecting from the outer end of said channel and connected to the free end of said nut projection.

* * * * *